(12) United States Patent
Ogawa et al.

(10) Patent No.: US 6,621,544 B2
(45) Date of Patent: Sep. 16, 2003

(54) LIQUID CRYSTAL DISPLAY APPARATUS AND PROJECTION-TYPE LIQUID CRYSTAL DISPLAY APPARATUS

(75) Inventors: Yasuyuki Ogawa, Yamatokoriyama (JP); Tamotsu Sakai, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 19 days.

(21) Appl. No.: 09/981,722

(22) Filed: Oct. 19, 2001

(65) Prior Publication Data

US 2002/0047951 A1 Apr. 25, 2002

(30) Foreign Application Priority Data

Oct. 20, 2000 (JP) .......................... 2000-321095

(51) Int. Cl.[7] .......................... H01L 21/00; H01L 21/84; G02F 1/1333
(52) U.S. Cl. .......................... 349/138; 349/122; 349/106; 438/149
(58) Field of Search .......................... 349/138, 122, 349/106, 43, 84, 155; 257/59, 72; 438/149, 151

(56) References Cited

U.S. PATENT DOCUMENTS

| 4,704,559 | A | * | 11/1987 | Suginoya et al. ........ 315/169.1 |
| 5,457,552 | A | * | 10/1995 | Ogurtsov et al. .............. 349/54 |
| 5,805,250 | A | * | 9/1998 | Hatano et al. ................. 349/96 |
| 5,926,702 | A | * | 7/1999 | Kwon et al. ................. 438/158 |
| 5,982,467 | A | * | 11/1999 | Lee ............................. 349/138 |
| 6,429,916 | B1 | * | 8/2002 | Nakata et al. .............. 349/106 |
| 6,437,847 | B1 | * | 8/2002 | Kishimoto ................... 349/155 |

FOREIGN PATENT DOCUMENTS

| JP | 4-324820 A | | 11/1992 | | |
| JP | 4-338718 A | | 11/1992 | | |
| JP | 11102907 A | * | 4/1999 | ......... | H01L/21/316 |
| JP | 2001-66635 A | | 3/2001 | | |
| JP | 2002131776 A | * | 5/2002 | ......... | G02F/1/1368 |

* cited by examiner

*Primary Examiner*—John F. Niebling
*Assistant Examiner*—Jennifer M. Kennedy
(74) *Attorney, Agent, or Firm*—Nixon & Vanderhye, P.C.

(57) ABSTRACT

The present invention relates to an active matrix-type liquid crystal display apparatus which drives liquid crystals by using thin film transistors and a projection-type liquid crystal display apparatus. That is, according to the present invention, in order to absorb a depressed structure in the region between wirings or devices where picture element electrodes are formed, an insulating film having a thickness equivalent to the difference in level is formed, patterning is carried out and, further, a different insulating film is formed on the wiring, switching devices and the insulating film formed above to obtain a structure equalized to the same level over the whole region of the wiring, the switching device and an area between the wirings.

7 Claims, 7 Drawing Sheets

without SiNx (b) (PRIOR ART)

with SiNx

LIQUID CRYSTAL DISPLAY APPARATUS AND PROJECTION-TYPE LIQUID CRYSTAL DISPLAY APPARATUS

FIELD OF THE INVENTION

The present invention relates to an active matrix-type liquid crystal display apparatus which drives liquid crystals by using thin film transistors (hereinafter, abbreviated as "TFT") and a projection-type liquid crystal display apparatus.

BACKGROUND OF THE INVENTION

Recently, active matrix-type liquid crystal display apparatuses using TFTs as a switching device which drives liquid crystals have been actively developed.

A conventional active matrix-type liquid crystal display apparatus comprises a TFT substrate and a common substrate which are arranged at a predetermined gap so as to face each other, and a liquid crystal layer held within both substrates.

On the TFT substrate, a TFT as a switching device and a display picture element electrode connected with the TFT are formed at a cross point of the scanning lines and the signaling lines arranged like a grid. The scanning line, the signaling line and the picture element electrode are electrically connected to a gate electrode, a source electrode and a drain electrode of the TFT, respectively. In the active matrix-type liquid crystal display apparatus having such a constitution, when a picture signal is applied through the signaling line in a state where a selection signal is applied to the gate electrode of the TFT, a predetermined signal charge is written to a corresponding picture electrode.

Common electrodes are arranged on the whole surface of the common substrate. An appropriate voltage is applied to the common electrodes through a common terminal disposed around the TFT substrate.

A picture element capacitor is formed between the picture element electrode and the electrode facing to the picture element electrode via liquid crystals. The TFT serves as a switching device which controls the charge flow into and from this capacitor.

The constitution mentioned above becomes a circuit element like a condenser, in which a liquid crystal material acts as a dielectric. The liquid crystals are raised up by applying a voltage to the picture element electrode to change transmittance so that picture displaying is carried out.

FIG. 5 (a) shows a layout of one picture element electrode of a conventional liquid crystal display apparatus. FIG. 5 (b) shows a cross sectional view of the apparatus along the B–B' line in FIG. 5 (a). A conventional manufacturing flow will be explained below using FIGS. 5 (a) and (b).

First, as an active layer, on an insulating substrate 11 is formed a polycrystalline silicon thin film 12 at a thickness of 40 nm~80 nm. Subsequently, a gate insulating film 13 is formed thereon at a thickness of 80 nm~150 nm by sputtering or a CVD method.

Next, a gate electrode 14 is patterned into a predetermined shape using a metal or polycrystalline silicon having a low resistance. Subsequently, in order to determine a conductivity type of this TFT, phosphate ions are injected from above the gate electrode 14 at a concentration of $1 \times 10^{15}$ (cm$^{-2}$) to form a channel region (polysilicon channel 12a) on a polycrystalline silicon thin film 12 underlying the gate electrode 14.

Then, after a first interlayer insulating film 15 is formed on the whole surface by using a silicon oxide film (SiO$_2$ film), a contact hole is formed.

After that, a signaling line 16 and a drain electrode 17 are formed by using a metal having a low resistance, such as Al.

Next, a second interlayer insulating film 18 is formed by stacking a silicon nitride film (SiN$_x$) and a SiO$_2$ film. Subsequently, dangling bonds existing in the polysilicon channel 12a are hydrogen termination-treated with hydrogen atoms supplied from the SiN$_x$ film by sintering to improve the transistor performances.

After formation of contact holes, a picture element electrode 19 is formed by using a transparent conductive film such as an indium tin oxide (ITO).

Recently, a liquid crystal display apparatus with a small picture element pitch has been developed, there are an apparatus having a pitch of one picture element of 30 μm or smaller, and sometimes, of 20 μm or smaller. Particularly, for a portable projector, a high-resolution liquid crystal display having a diagonal size of 1 inch or smaller is used for downsizing the apparatus as a whole.

In the conventional liquid crystal display apparatus, when the apparatus is made to have high resolution, since the region of the picture element electrode is depressed relative to the wiring around them and the region of the TFT, the picture element electrodes can not be rubbed sufficiently in the alignment of liquid crystals to reduce the orientation force of the liquid crystals on the picture element electrodes, which, in turn, results in the occurrence of display troubles.

Against the above problem, techniques for improving the display performances by planarizing the region of the picture elements are disclosed in JP-A 4-3248120 and JP-A 4-338718. FIG. 6 shows the constitution of the liquid crystal display apparatus disclosed in JP-A 4-324820 relating to the planarization, and FIG. 7 shows the constitution of the liquid crystal display apparatus disclosed in JP-A 4-338718.

The liquid crystal display apparatus disclosed in JP-A 4-324820 comprises, as shown in FIG. 6, a wiring 21, a picture element electrode 22, and an insulating substrate and lower layer 23. In FIG. 6, after forming a layer other than the wiring 21 and the picture element electrode 22 and pattern 23 on the insulating substrate, the insulating film 24 is formed so as to be disposed below the picture element electrode 22 and, then, the picture element electrode 22 and the wiring 21 are formed. When the liquid crystal display apparatus is a transmission type, since a transparent material must be used for the insulating film 24, for example, a photosensitive transparent polyimide resin is used.

In JP-A 4-338718, as shown in FIG. 7, in order to planarize the upper side of the wiring 21 and the surface of the picture element electrode 22, the picture element electrode is underlaid with a transparent insulating film 24 to level the region up, or the wiring is leveled down by etching in advance. Then, the level difference between the wiring 21 and the transparent electrode 22 of the picture element is planarized by covering the wiring 21 with an insulating film 25. As the insulating film 25, for example, a polyimide resin film is used.

In an active matrix-type liquid crystal display apparatus, higher resolution is required than before and, consequently, when a picture element pitch becomes narrower, improvements in an aperture ratio and transmittance are required to secure brightness.

In order to secure a desired aperture ratio, it is needed to enlarge the area of the picture element electrode as large as possible. However, since the wiring 21 or the wiring 21 covered with the insulating film 25 and the insulating film 24 do not make a consequential flat surface in the above conventional technique, a region where the picture element electrode 22 can be formed is limited only on the insulating film 24. Therefore, based on the conventional constitutions shown in FIGS. 6 and 7, schematic cross-sectional views of constitutions in the case where the region in which the picture element electrode is to be formed is extended over not only the insulating film 24 but also the surface of the wiring 21 are shown in FIGS. 8 and 9.

In the constitution shown in FIG. 8, since the wiring 21 and the picture element electrode 22 directly contact with each other, the picture elements are always electrically connected with the wiring. In addition, in both constitutions shown in FIGS. 8 and 9, due to the influence by the difference in level of the wiring, it is impossible to make a flat picture element electrode. Consequently, liquid crystals can not be aligned uniformly in a rubbing step.

Thus, in the conventional constitution, since the picture element electrode 22 can not be formed in a region other than the region of the insulating film 24, it can not be expected to improve the aperture ratio.

Further, in the conventional technique, since a refractive index of a $SiN_x$ film being stacked for a hydrogen termination treatment is 1.8~2.0, which is different from that of other insulating film (e.g., $SiO_2$ film) or a substrate (1.4~1.6), reflection at a boundary occurs, as shown in FIG. 10 (b), due to a change in refractive index, resulting in reduction of transmittance as shown in FIG. 11.

With considering the technical background mentioned above, objects of the present invention are to allow a picture element electrode to be formed also on the wiring 21 by continuously planarizing the region of the wiring 21 and the insulating film 24 to improve the aperture ratio and, also to enhance transmittance of the panel by eliminating a stacking structure composed of insulating films, each having a different refractive index, to improve display performances of a liquid crystal display apparatus.

SUMMARY OF THE INVENTION

The present invention provides a liquid crystal display apparatus comprising thin film transistors as a switching device formed on cross points of scanning lines and signaling lines arranged on a substrate like a grid, and picture element electrodes connected with the thin film transistors, wherein a first insulating film covering a wiring of the scanning lines and the signaling lines, and having a pattern in which at least a part of a region surrounded by two adjoining scanning lines and two adjoining signaling lines is eliminated and a second insulating film having a pattern existing only in the region surrounded by two adjoining scanning lines and two adjoining signaling lines are formed and, a third insulating film is further formed over the first and second films. In addition, the liquid crystal display apparatus of the present invention is characterized in that thickness of the third insulating film is at least ½ or greater a width of spacing between the second insulating film and the wiring.

That is, according to the present invention, in order to absorb a depressed structure in the region between wirings or devices where picture element electrodes are formed, an insulating film having a thickness equivalent to the difference in level is formed, patterning is carried out and, further, a different insulating film is formed on the wiring, switching devices and the insulating film formed above to obtain a structure equalized to the same level over the whole region of the wiring, the switching device and an area between the wirings.

The liquid crystal display apparatus of the present invention is characterized in that the first insulating film is a transparent $SiN_x$ film having a refractive index of 1.8~2.0, and the second insulating film is a transparent $SiO_2$ film having a refractive index of 1.4~1.6.

That is, according to the present invention, while carrying out a hydrogen termination treatment on a TFT, the transmittance of the opening is enhanced, as shown in FIG. 11, because a $SiN_x$ film on the opening is eliminated.

The liquid crystal display apparatus of the present invention is characterized in that the eliminated region of the first insulating film is smaller than the pattern of the second insulating film so that the peripheral of the second insulating film is formed over the first insulating film, and the first insulating film serves as an etching stopper when the second insulating film is etched.

In the present invention, since the first insulating film is formed underneath the peripheral of the second insulating film and, consequently serves as an etching stopper when the second insulating film is etched, the etching step can be simplified.

The liquid crystal display apparatus of the present invention is characterized in that the third insulating film formed over the first and second insulating films is thinned by etching back.

In order to planarize a surface of the liquid crystal display apparatus by filling the space between the insulating film pattern and the wiring, it is required to make the upperlayer insulating film thick to some extent. However, according to the present invention, an insulating film having a desired thickness can be obtained by etching the whole surface after forming the upperlayer insulating film.

The liquid crystal display apparatus of the present invention is characterized in that the picture element electrodes are arranged at a pitch of 30 $\mu$m or less.

That is, according to the present invention, display performances of a high resolution liquid crystal display apparatus having a diagonal size of, for example, one inch or smaller can be improved.

Further, the present invention also provides a projection-type liquid crystal display apparatus using the above liquid crystal display apparatus.

That is, by using the liquid crystal display apparatus of the present invention, a projection-type liquid crystal display apparatus which is bright and excellent in a displaying quality can be manufactured.

DETAILED DESCRIPTION OF THE INVENTION

Figure 1:
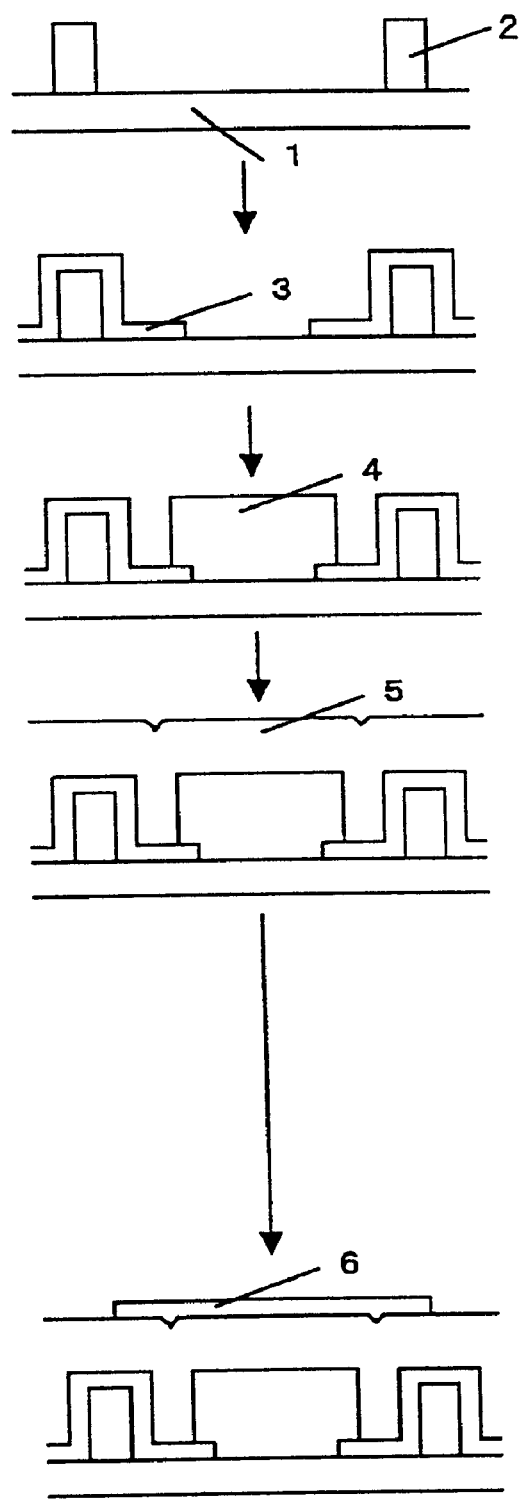
FIG. 1 is a flow diagram showing a process for manufacturing a liquid crystal display apparatus of the first aspect of the present invention.

Embodiments of the present invention will be explained with referring to the drawings below.

FIG. 1 represents schematic cross-sectional views explaining a process flow of the first aspect of the embodiment of the present invention.

Figure 5:
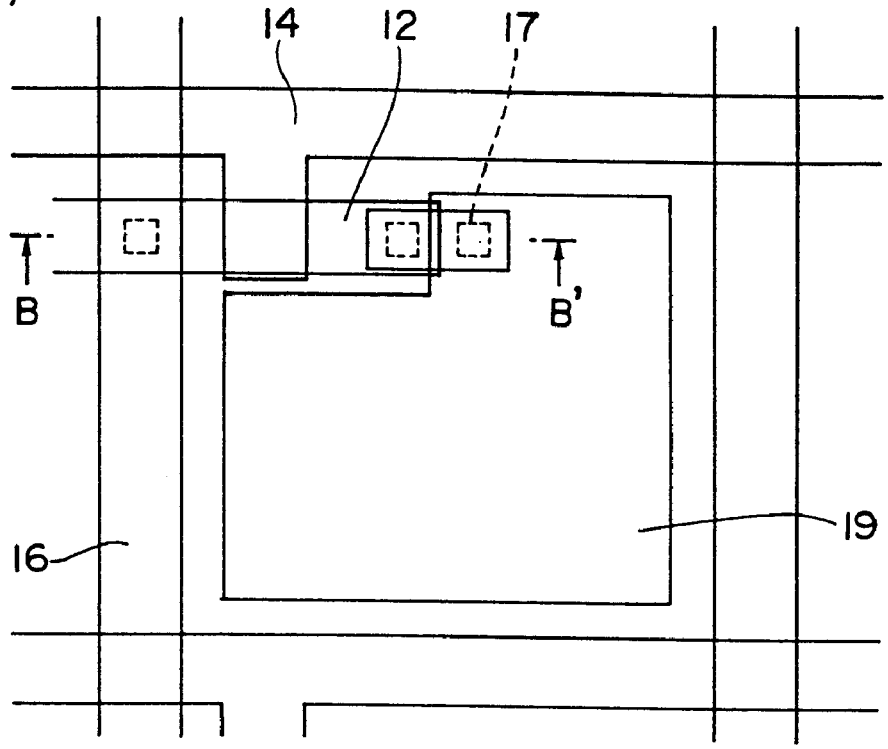
FIG. 5 shows a schematic plan view (a) and a schematic cross-sectional view (b) of a conventional picture element.
Figure 5:
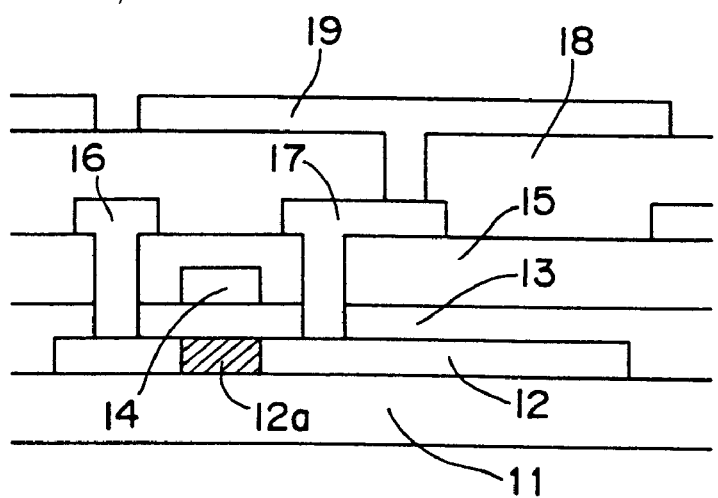
Figure 6:
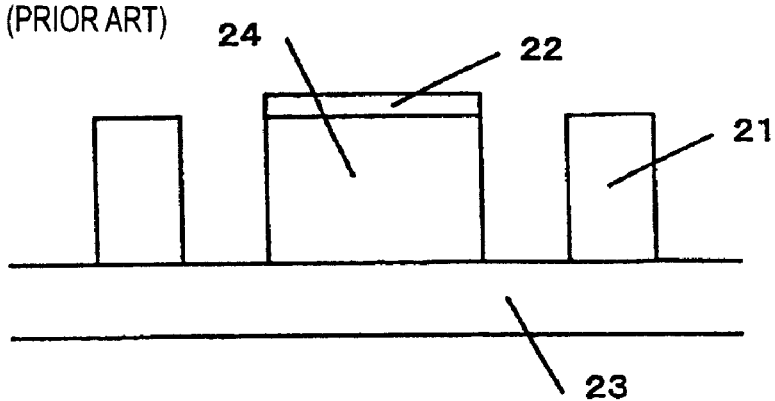
FIG. 6 shows a schematic cross-sectional view of a conventional liquid crystal display apparatus disclosed in JP-A 8-324820.
Figure 7:
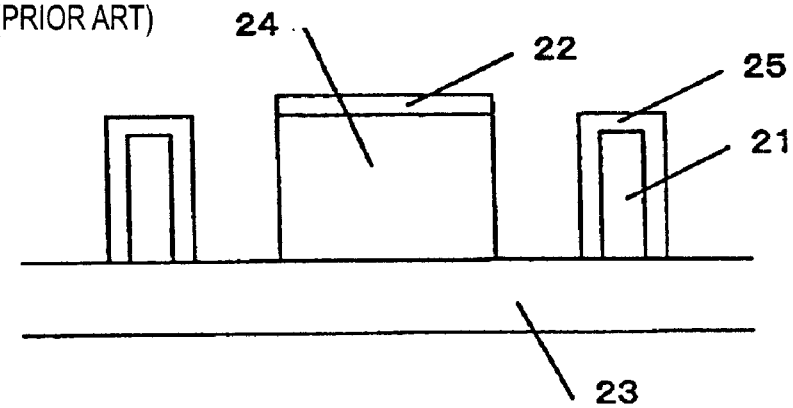
FIG. 7 shows a schematic cross-sectional view of a conventional liquid crystal display apparatus disclosed in JP-A 8-338718.
Figure 8:
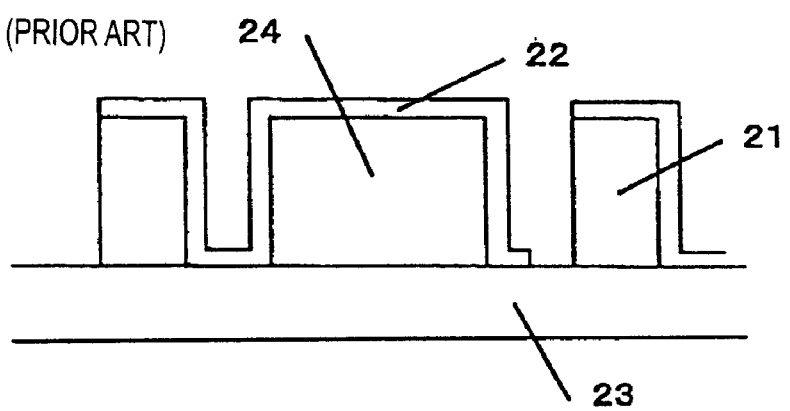
FIG. 8 shows a schematic cross-sectional view of the liquid crystal display apparatus illustrated in FIG. 6, wherein a picture element electrode is formed on a wiring.
Figure 9:
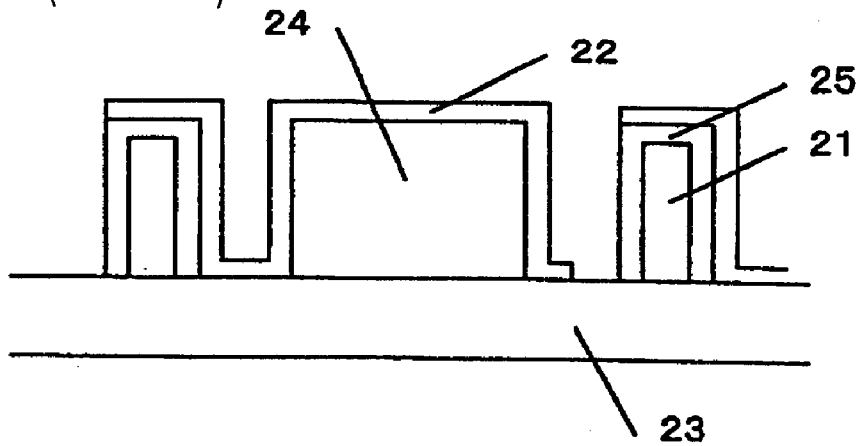
FIG. 9 shows a schematic cross-sectional view of the liquid crystal display apparatus illustrated in FIG. 7, wherein a picture element electrode is formed on wiring.
Figure 10:
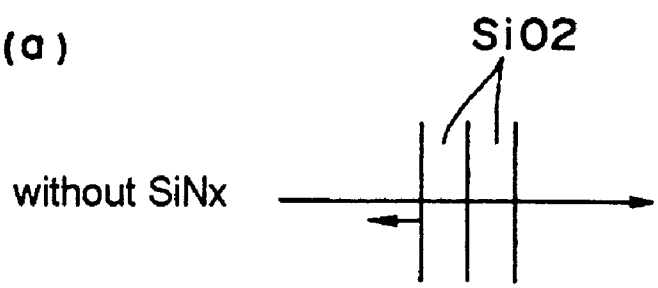
FIG. 10(a) and FIG. 10(b) show a conceptual illustration indicating transmission and reflection of a light at an opening.
Figure 10:
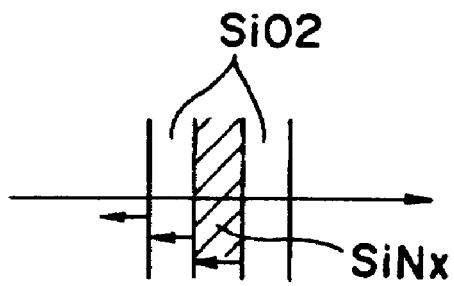
Figure 11:
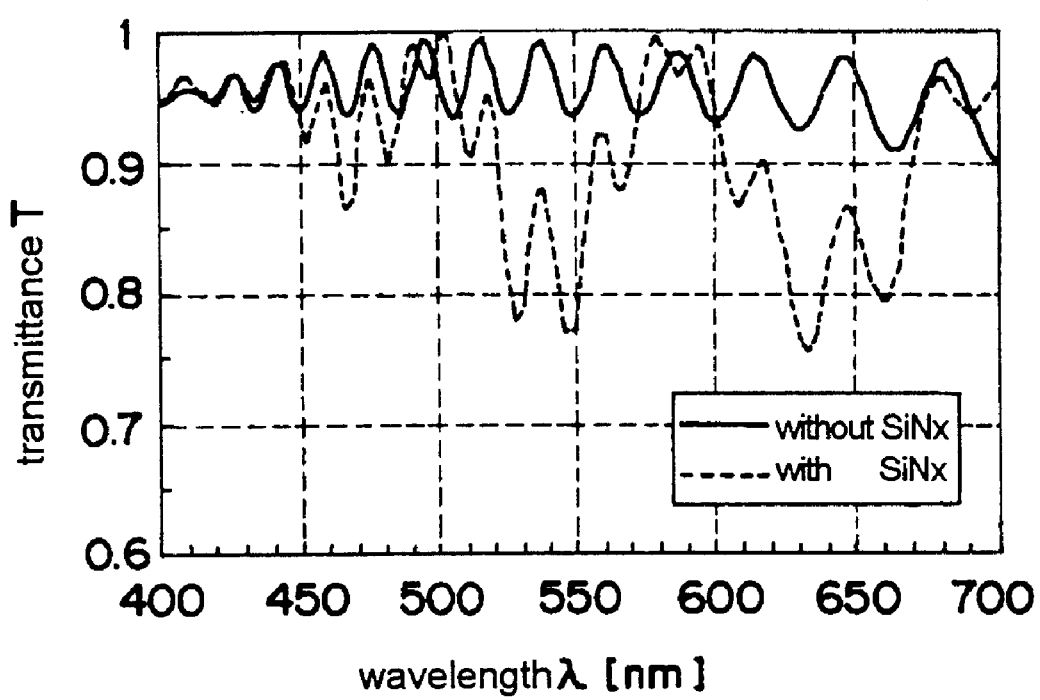
FIG. 11 shows a panel transmission simulation.

First, a substrate comprising an insulating substrate and a lower layer 1 is obtained according to a process similar to the conventional process until the formation of the signaling lines 16 in FIG. 5. A wiring 2 having a thickness of about a few hundreds nm, e.g., 300~700 nm is formed on the substrate comprising an insulating substrate and a lower layer 1 by using Al metallic materials and the like.

After that, a $SiN_x$ film having a thickness of, for example, 100~200 nm is deposited and, the channel region in the lower layer is hydrogen termination-treated by sintering. Subsequently, a region between adjoining wirings 2, which is an picture element opening, is eliminated by patterning using a photolithography technique to make a first insulating film 3. At this time, it is desired that the shape of the eliminated pattern is a smaller pattern than a second insulating film pattern described below by around 0.2~0.5 μm, which is equivalent to a margin for alignment displacement.

Figure 2:
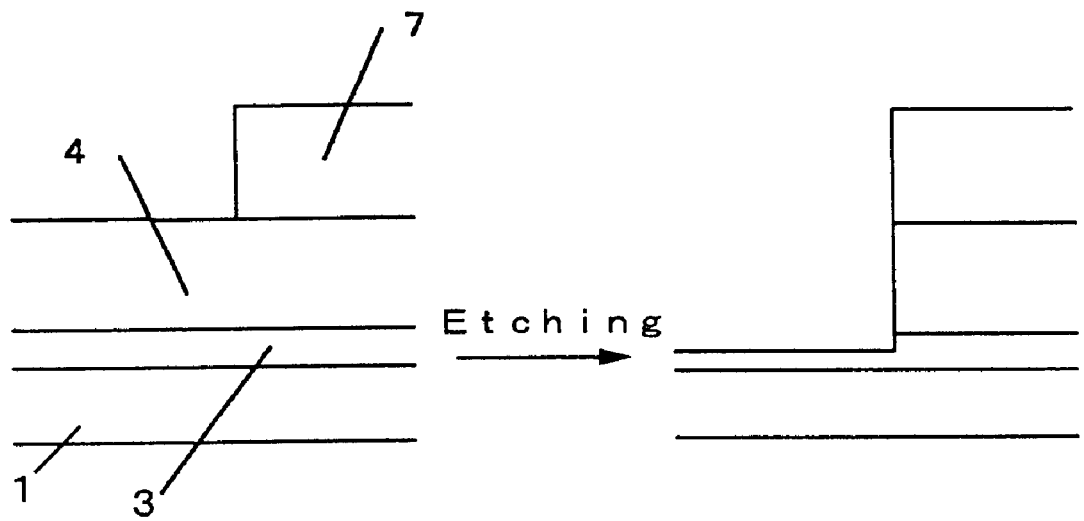
FIG. 2 shows a conceptual illustration of an etching stopper.

Next, in order to fill the difference in level from the surface of the substrate to the upper side of the wiring 2 covered with the first insulating film 3, a SiO2 film having a thickness of about a few hundreds to a thousand nm is formed and patterning is carried out by etching to form a second insulating film 4 between the wirings 2. At this time, the first insulating film 3 mentioned above may serve as an etching stopper for the formation of the second insulating film 4 to prevent the lower layer from being etched (see FIG. 2).

Figure 3:
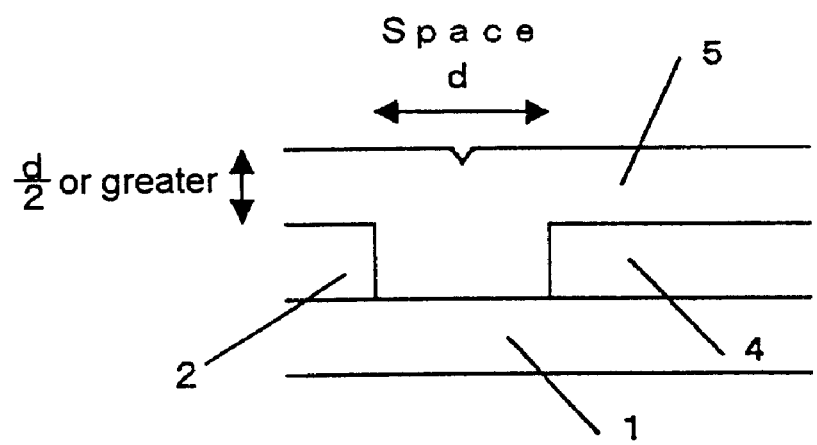
FIG. 3 shows a conceptual illustration of a pattern shape of the second insulating film.

In addition, the shape of the pattern for the insulating film 4 is not limited, as long as a certain space width d is secured from the wiring pattern, the drain electrode and the like, as described below (see FIG. 3).

After formation of the insulating film 4, a third insulating film 5 is further formed. At this time, a flatness over the third insulating film 5 may be controlled by controlling the space width d between the wiring 2 and the pattern of the insulating film 4.

When the space width d is too wide, since difference in level is formed above the space between the wiring 2 and the second insulating film 4 when the third insulating film 5 is formed, flatness can not be improved. On the other hand, when the space width d is too narrow, since the third insulating film 5 can not fill the space, a cavity is formed within the space. For example, the space width d should be, for example, about 1.5 μm. Since the third insulating film 5 is formed to planarize the upper layer by filling the space upon formation of a film, a thickness of the formed film is needed to be at least ½ or greater the space width d (see FIG. 3). For example, when the space width d is about 1.8 μm, an oxide film $SiO_2$ having a thickness of about 900 nm or greater should be formed, and practically, the insulating film 5 is formed at a thickness of about 1100 nm.

On the third insulating film 5 formed as mentioned above, picture element electrode 6 is formed, for example, by sputtering and the like using a transparent conductive film such as ITO or $In_2O_3$-Zn metal oxide. Additionally, the thickness of the picture element electrode 6 is around 100~150 nm when ITO and the like is used.

Figure 4:
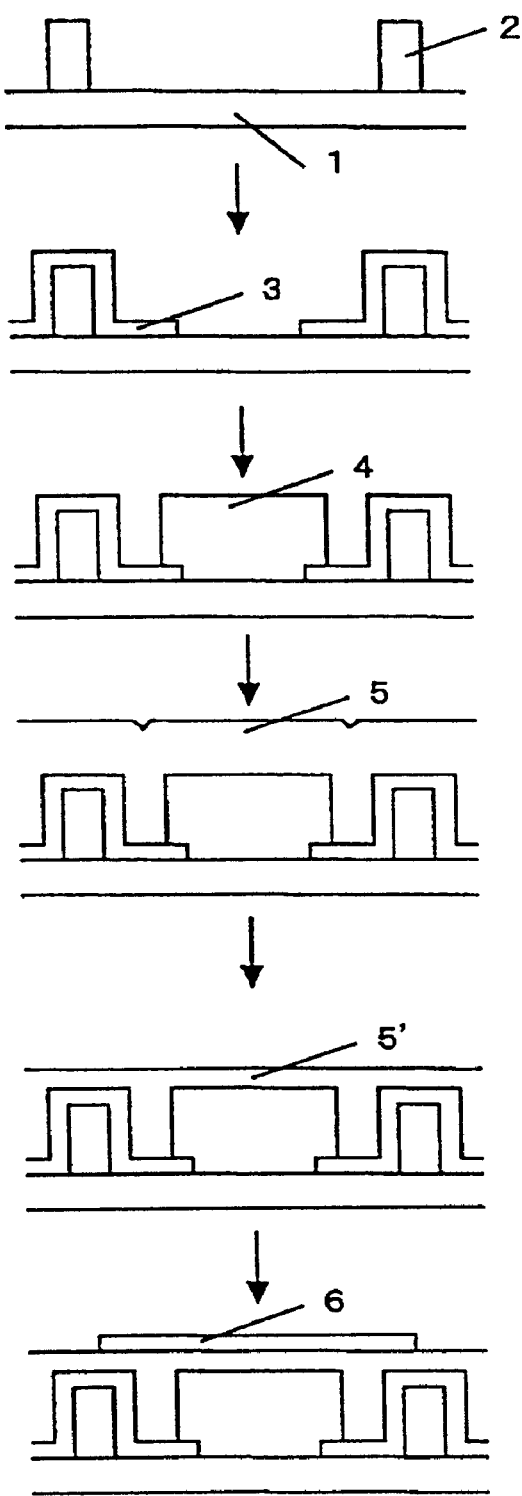
FIG. 4 is a flow diagram showing a process for manufacturing a liquid crystal display apparatus of the second aspect of the present invention.

Next, FIG. 4 represents schematic cross-sectional views explaining a process flow of the second aspect of the embodiment of the present invention.

Similar to the first aspect of the embodiment of the embodiment, on a substrate are formed a wiring 2, a first insulating film 3 and a second insulating film 4 and, then, a third insulating film 5 is deposited on the whole surface.

In the second aspect of embodiment of the present invention, the whole surface of the third insulating film 5 is etched back to reduce the thickness of the insulating film 5 on the wiring 2. In order to fill the space and to improve the flatness, it is better that the insulating film 5 is thicker. However, since it is required to form a fine contact hole on the insulating film 5 to connect with the picture element electrode 6, the thickness becomes thicker, the formation and control of the fine pattern by etching become more difficult. In addition, as described above, when ITO and the like are used, the thickness of the picture element electrode 6 is only around 100~150 nm and, therefore, with considering the coverage of the thin film picture element electrode 6 in the contact hole, it is better that the insulating film 5 in which contact holes are formed is thinner. Thus, at the time of deposition, the insulating film 5 is formed thick at a thickness of, for example, about 1100 nm and, subsequently, the whole surface of the insulating film 5 formed thick is etched back to control the insulating film 5 so as to have a desired thickness. In addition, since the difference in level of the insulating film 5 slightly occurring above the space at the formation can be eliminated, the flatness can be further improved. With considering the coverage of the picture element electrode 6 and the like, the thickness of the insulating film 5 after reduction in thickness is adjust to 200~400 nm.

Subsequently, the picture element electrode 6 is formed on the insulating film 5 whose thickness has been reduced by etching back similar to the first aspect of the embodiment.

EXAMPLES

Examples of the present invention will be illustrated below, but the present invention is not limited thereto.

Example 1

On the insulating substrate 1 on which a signaling wire had been formed using the similar process shown in FIG. 5, the wiring 2 was formed using an Al metallic material. The thickness of the wiring 2 was 700 nm. Then, a $SiN_x$ film, the first insulating film 1, was deposited at a thickness of 200 nm. After the channel region in the lower layer was hydrogen termination-treated by sintering, the region between the wirings was removed by pattering using a photolithography technique to form the first insulating film 3.

Next, a $SiO_2$ film having a thickness of 700 nm was formed and patterned to form the second insulating film 4 between the wirings 2. At this time, the space width d between the wiring 2 and the insulating film 4 was 1.5 μm.

After the pattern of the insulating film 4 was formed, the third insulating film 5 having a thickness of 1100 nm was further formed.

In addition, the thin film picture element electrode 6 having a thickness of 100 nm was formed on the insulating film 5 using ITO.

Example 2

Next, as in Example 1, after the second insulating film 4 in the region surrounded by the wiring was formed, the third insulating film 5 having a thickness of 1100 nm was formed. Subsequently, the whole surface of the insulating film 5 was etched back 400 nm to make the thickness of the film 5 700 nm.

In addition, the picture element electrode 6 was formed using ITO. The thickness thereof was 100 nm.

INDUSTRIABILITY OF THE INVENTION

According to the present invention, the whole region of the wiring and the area surrounded by the wirings is smooth and flat, and picture element electrodes can be formed on the flat region. Thereby, since an impediment to a rubbing for alignment of liquid crystals due to the difference in level is reduced, deterioration in the displaying quality such as a defect in alignment may be prevented. In addition, since the flatness on the wiring and the region surrounded by the wiring is continual, and since the wiring is also covered with the insulating film, it becomes possible to form picture element electrodes on the upper layer of the wiring, the picture element electrodes can be formed within a wide area, and the aperture ratio can be improved.

In the future, accompanied by improvement in high resolution, it may be required to lower the resistance of the wiring. For example, it is supposed to progress in thickening the wiring thickness. However, the present invention can easily cope with various thickness only by controlling the thickness of the insulating film 5 when the film is formed, for example, the thickness control to a large difference in level or, on the contrary, a small difference in level.

In addition, according to the present invention, panel transmittance can be enhanced by preventing a reflection of light at the boundary of insulating films, each having a different refractive index, in combination with the planarization, a high resolution active matrix-type liquid crystal display apparatus having a high aperture ratio and a high transmittance can be provided.

What we claimed are:

1. A liquid crystal display apparatus comprising thin film transistors as a switching device formed on cross points of scanning lines and signaling lines arranged on a substrate like a grid, and picture element electrodes connected with the thin film transistors, wherein a first insulating film covering a wiring of the scanning lines and the signaling lines, and having a pattern in which at least a part of a region surrounded by two adjoining scanning lines and two adjoining signaling lines is eliminated and a second insulating film having a pattern existing only in the region surrounded by two adjoining scanning lines and two adjoining signaling lines are formed and, a third insulating film is further formed over the first and second films.

2. The liquid crystal display apparatus according to claim 1, wherein a thickness of the third insulating film is at least ½ or greater a width of spacing between the second insulating film and the wiring.

3. The liquid crystal display apparatus according to claim 1, wherein the first insulating film is a transparent $SiN_x$ film having a refractive index of 1.8 ~2.0, and the second insulating film is a transparent $SiO_2$ film having a refractive index of 1.4~1.6.

4. The liquid crystal display apparatus according to claim 1, wherein the eliminated region of the first insulating film is smaller than the pattern of the second insulating film so that the peripheral of the second insulating film is formed over the first insulating film, and the first insulating film serves as an etching stopper when the second insulating film is etched.

5. The liquid crystal display apparatus according to claim 1, wherein the third insulating film formed over the first and second insulating films is thinned by etching back.

6. The liquid crystal display apparatus according claim 1, wherein the picture element electrodes are arranged at a pitch of 30 μm or less.

7. A projection-type liquid crystal display apparatus comprising the liquid crystal display apparatus according to claim 1.

* * * * *